United States Patent
Sullivan et al.

(10) Patent No.: US 7,456,404 B2
(45) Date of Patent: Nov. 25, 2008

(54) VIEWING SYSTEM FOR RADIOGRAPHS

(75) Inventors: Nicole L. Sullivan, Elgin, IL (US); Curtis L. Steward, Jr., Sandwich, IL (US); Rick Pecore, Manitowoc, WI (US); James D. Borowski, Appleton, WI (US); James Todd Olejniczak, Appleton, WI (US); John Masters, Tully, NY (US)

(73) Assignee: DENTSPLY International, Inc., York, PA (US)

( * ) Notice: Subject to any disclaimer, the term of this patent is extended or adjusted under 35 U.S.C. 154(b) by 0 days.

(21) Appl. No.: 10/596,036

(22) PCT Filed: Nov. 24, 2004

(86) PCT No.: PCT/US2004/039610

§ 371 (c)(1),
(2), (4) Date: Mar. 29, 2007

(87) PCT Pub. No.: WO2005/054942

PCT Pub. Date: Jun. 16, 2005

(65) Prior Publication Data

US 2007/0272865 A1    Nov. 29, 2007

Related U.S. Application Data

(60) Provisional application No. 60/525,055, filed on Nov. 26, 2003.

(51) Int. Cl.
*G01J 3/00* (2006.01)

(52) U.S. Cl. .................................. 250/338.1; 250/340

(58) Field of Classification Search ............ 250/338.1, 250/340
See application file for complete search history.

(56) References Cited

U.S. PATENT DOCUMENTS

| | | | | |
|---|---|---|---|---|
| 3,896,576 | A * | 7/1975 | Wolf et al. | 40/367 |
| 3,968,365 | A * | 7/1976 | Sohngen | 250/338.1 |
| 4,118,654 | A | 10/1978 | Ohta et al. | |
| 4,341,453 | A * | 7/1982 | Rubin | 396/568 |
| 4,510,708 | A | 4/1985 | Pokrinchak | |
| 4,996,786 | A * | 3/1991 | Shoenfeld | 40/361 |
| 5,692,818 | A | 12/1997 | Kitagawa | |
| 6,311,419 | B1 | 11/2001 | Inbar | |
| 6,714,324 | B1 * | 3/2004 | Kurosawa et al. | 358/487 |

FOREIGN PATENT DOCUMENTS

JP         07306378         11/1995

* cited by examiner

*Primary Examiner*—David P. Porta
*Assistant Examiner*—Mark R Gaworecki
(74) *Attorney, Agent, or Firm*—Douglas J. Hura; Daniel W. Sullivan (57) ABSTRACT

A light control system and method for a film viewer (10). The viewer (10) includes an infrared emitter (50) with an infrared detector (52) in communication with a microprocessor (34). When a radiograph (40) is inserted within the film viewer (10), the radiograph (10) is interposed between the emitter (50) and detector (52). The microprocessor (34) detects a change in the emissions sensed by the detector (52) and illuminates the viewer (10). The invention also provides a film holder (16) that includes a plurality of rollers (60) interposed between the holder (16) and the screen (14).

17 Claims, 6 Drawing Sheets

VIEWING SYSTEM FOR RADIOGRAPHS

CROSS-REFERENCE TO RELATED APPLICATIONS

This application is a U.S. National Stage application of PCT/U504/39610, filed Nov. 24, 2004, which itself claims priority to U.S. Provisional Application No. 60/525,055 filed Nov. 26, 2003, both of which are hereby incorporated by reference.

BACKGROUND OF THE INVENTION

The present invention relates generally to radiograph viewers and more specifically to a radiograph viewer having a detection system for activating and deactivating the light source of the viewer.

Radiograph or x-ray viewers are used by medical and dental professionals to illuminate radiographs and x-rays for viewing. A conventional film viewer includes a housing with a flat screen, a light source within the housing that can illuminate the screen, and a securing device to secure the radiographs to the screen. When the viewer is illuminated, the detail of a radiograph or film can be more clearly seen by a technician.

Generally, the light source of conventional viewers is not energized when the viewer is not in use, requiring the technician to manually energize the viewer to use it and manually de-energize the viewer when finished using it. This inconvenience to the technician, which may be a dentist, radiologist, or other medical professional, distracts from the task of interpreting the information contained in the film. One attempt to address this inconvenience has been to provide automatic switching mechanisms to energize/deenergize the viewer. One drawback associated with many automatic switching mechanisms is the cost and reliability of the components.

What is needed, therefore, is a radiograph viewer with an automatic illumination function that is reliable and affordable.

SUMMARY OF THE INVENTION

In one embodiment, the present invention is directed to a light control system for a film viewer including an emitter, a detector disposed adjacent to the emitter and configured to detect emissions from the emitter, and a microprocessor configured to control a light in response to a change in the detected emissions resulting from one of an insertion of a film between the emitter and the detector and a removal of a film from between the emitter and the detector.

Another embodiment of the present invention is directed to a viewer that includes a housing, a light, an emitter, a detector adjacent the emitter and configured to detect emissions from the emitter, and a microprocessor configured to detect a change in emissions detected by the detector when a film is interposed between the emitter and the detector. The microprocessor is further configured to energize/deenergize a light in response to the detected change in emissions.

Yet another embodiment of the present invention is directed to a method of automatically illuminating a film viewer. The method includes the steps of emitting a detectable emission with an emitter, detecting a level of emissions received by a detector, and determining a change in the detected level of emissions. The method further includes automatically controlling a light source in the film viewer in response to the determined change in the detected level of emissions exceeding a preselected value. In a further embodiment, the present invention provides a series of rollers to hold the film(s) in position.

One advantage of the present invention is that the film viewer can be energized and deenergized without the need for the operator to manipulate a separate switch.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF INVENTION

Figure 1:
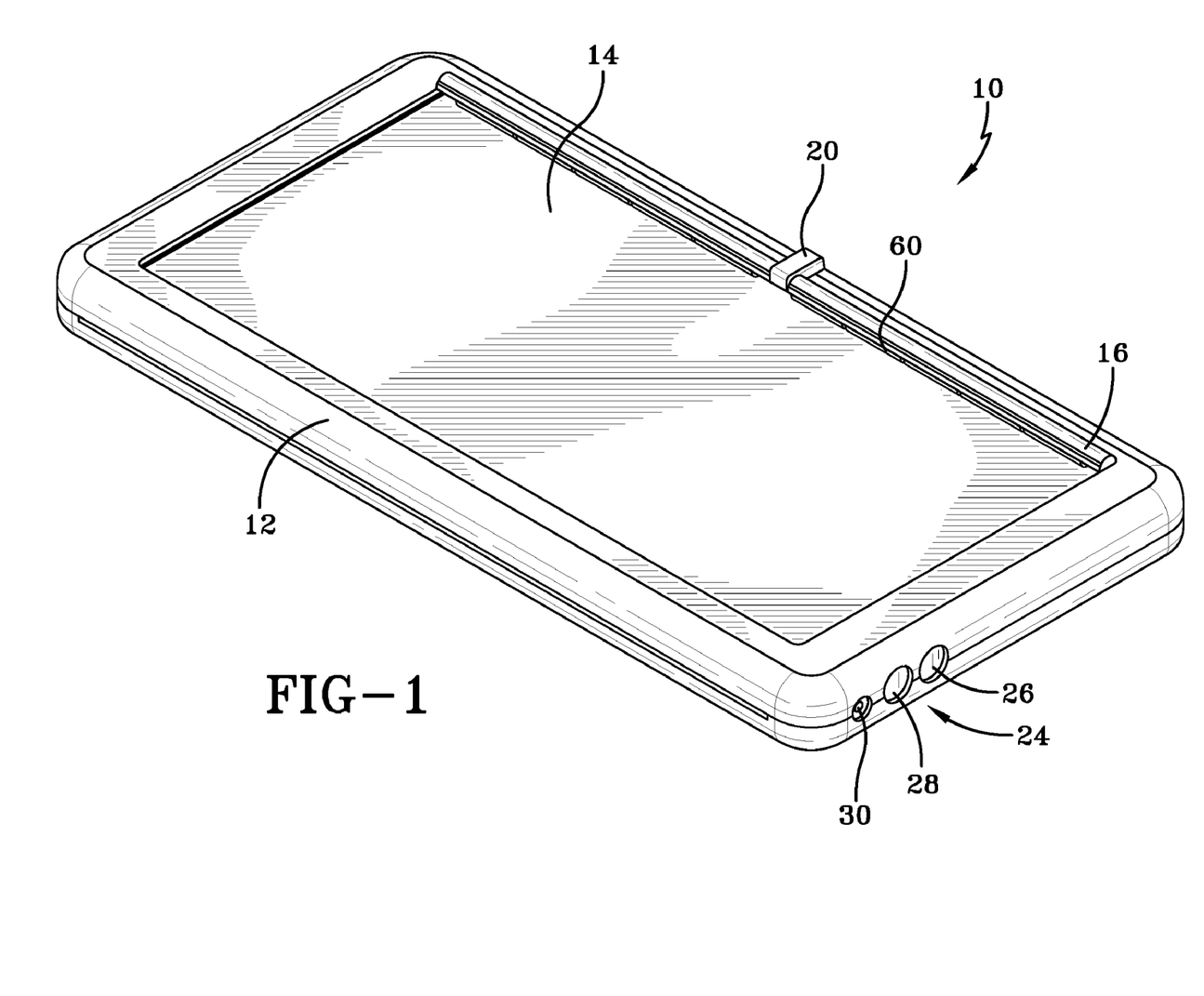
FIG. 1 is a perspective view of a radiograph viewer of the present invention.

The present invention is directed to a viewer, light box or illuminator for illuminating or lighting radiographs, x-rays, films, transparencies, or similar items. In a preferred embodiment of the present invention, the viewer is used for illuminating dental x-rays and radiographs. With brief reference to FIG. 1, the viewer 10 of the present invention includes a housing 12, and a screen, plate or face plate 14. Within housing 12 is a light source (not shown) that is provided to illuminate the screen 14. The light source is preferably a cold-cathode lighting system, but any suitable lighting system can be used. Also incorporated in housing 12 is a holding arrangement or holder 16 for securing radiographs, x-rays, films, etc., in position for viewing upon activation of the light source. Viewer 10 also includes a light control system 24. Light control system 24 includes dimmer buttons 26, 28 and a power connection 30. The light control system 24 preferably operates on DC power received from the power connection 30.

Figure 2:
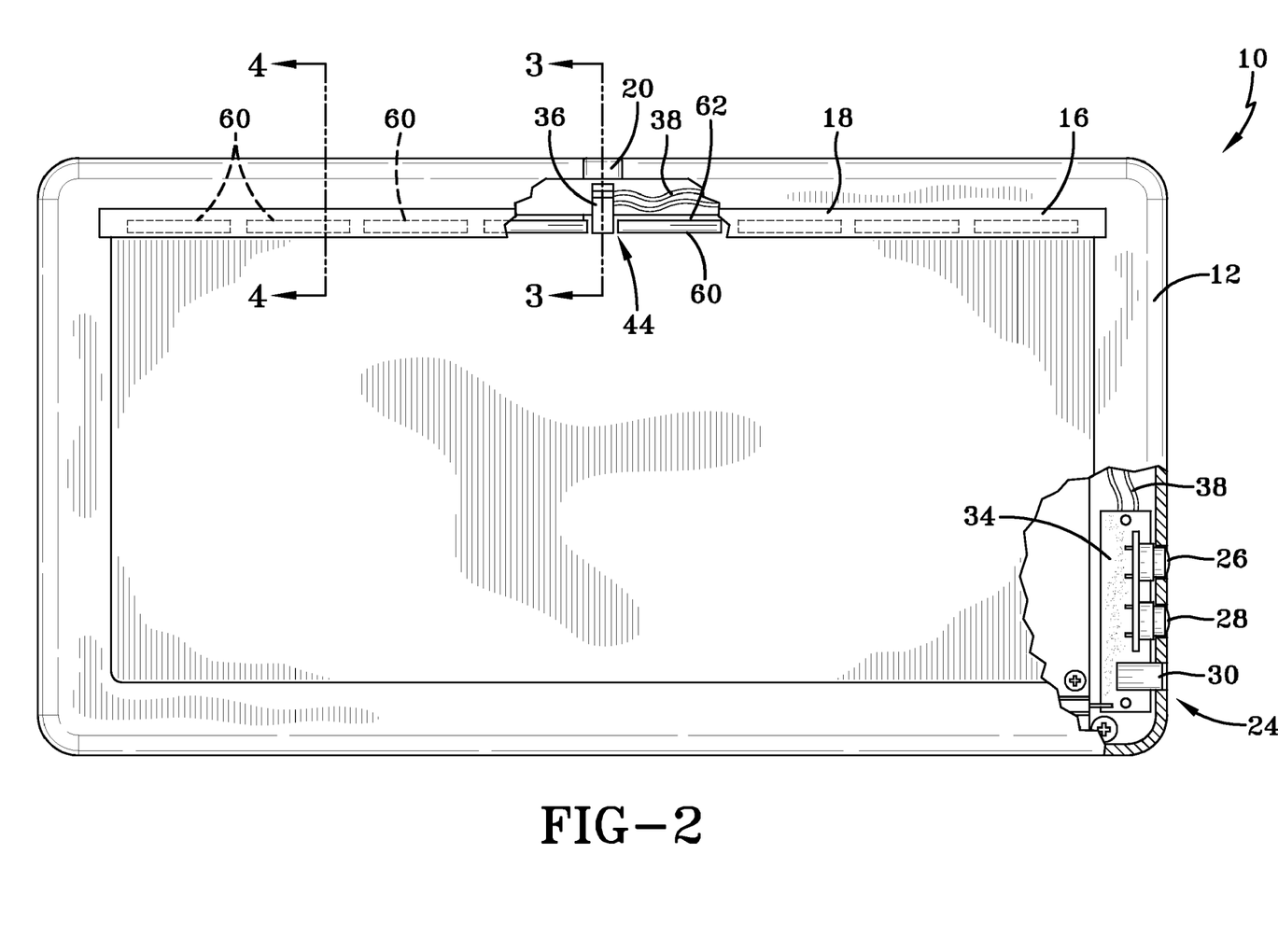
FIG. 2 is a plan view of the viewer of FIG. 1 with the housing partially cut-away to illustrate additional features in more detail.

Referring now to FIG. 2, light control system 24 further includes a microprocessor 34 in electronic communication with a switch mechanism 36 via coupling or wiring arrangement 38. In a preferred embodiment, microprocessor 34 is preferably a single microprocessing chip on a single printed circuit board. However, in other embodiments of the present invention, the microprocessor 34 can include multiple microprocessing chips disposed on one or more printed circuit boards. Microprocessor 34 is also in electrical communication with the light source, dimmer buttons 26, 28 and power connection 30. Dimmer buttons 26, 28 and power connection 30 preferably have direct electrical connections to the circuit board of the microprocessor 34, but can also be connected to the microprocessor 34 through one or more circuit boards.

Figure 3:
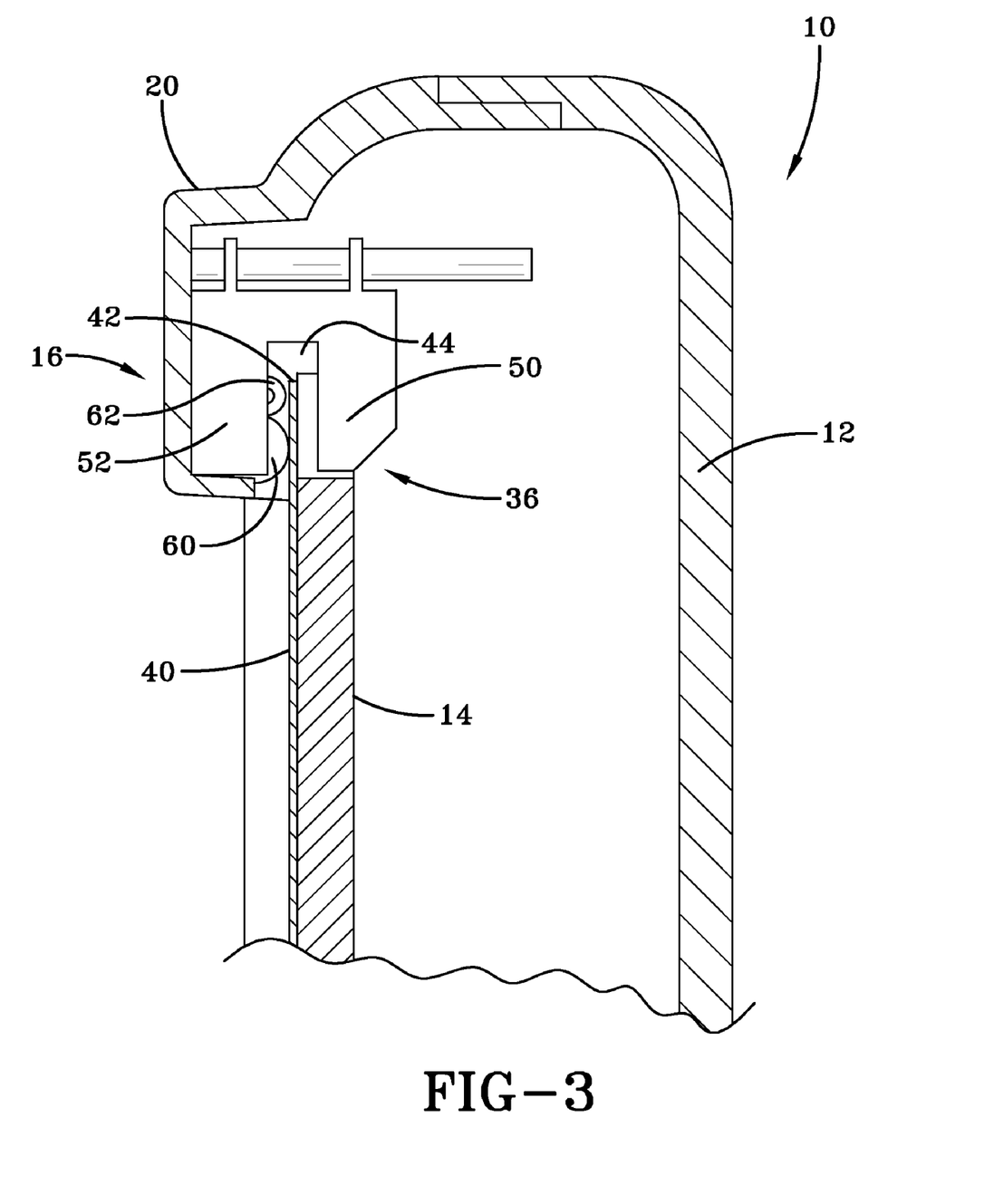
FIG. 3 is a sectional view taken along the line 3-3 in FIG. 2, with the light source removed for clarity.

With reference to FIG. 3, a portion of viewer 10 is shown in cross section with a film, or radiograph, 40 secured thereto. In the embodiment shown, an upper portion 42 of film 40 is positioned within the film holder 16 to hold or secure the radiograph 40. To accommodate switch mechanism 36, screen 14 includes a cut out section 44. Switch mechanism 36 is partially enclosed by a raised portion of the housing 12 and includes an emitter 50, preferably an infrared (IR) emitter, and a detector 52, preferably an infrared (IR) detector. Switch mechanism 36 may further be enclosed by a switch housing 20 that may optionally be used, for example, where the dimensions of switch mechanism 36 would otherwise extend beyond housing 12. While an IR emitter and an IR detector are preferred, other suitable types of emitters and detectors can be used. IR emitter 50 is preferably electrically coupled to a power source via coupling arrangement 38 and emits a predetermined amount of infrared radiation either continuously or at a predetermined frequency. Preferably, switch mechanism 36 comprises an optical interrupter. Even more preferably, IR emitter 50 is an infrared LED that is current modulated to provide a consistent 4 volts output to IR detector 52. IR detector 52 is positioned such that the radiation or emissions from IR emitter 50 can pass or travel through cutout section 44 of screen 14 for detection by IR detector 52. After receiving radiation, or emissions, from the IR emitter 50, IR detector 52 sends a signal to microprocessor 34 via coupling arrangement 38 indicative of the magnitude of the emissions detected by the IR detector 52.

In order to activate the light source of the viewer 10 to view a film, mount, radiograph, x-ray or other type of partial transparency 40, a technician or operator places the film 40 on screen 14 and inserts the film 40 into the holder 16 such that the film 40 is interposed between IR emitter 50 and IR detector 52. When the film 40 is interposed between IR emitter 50 and IR detector 52, the magnitude of radiation or emissions detected by IR detector 52 from IR emitter 50 can change, even when the film is transparent or optically clear. In a preferred embodiment of the present invention IR emitter 50 can emit radiation at a predetermined power level. The IR detector 52 can then detect the power level of the radiation received by the IR detector 52 from the IR emitter 50. If the IR detector 52 receives radiation at substantially the predetermined power level emitted by the IR emitter 50, then no film 40 has been interposed between the IR emitter 50 and the IR detector 52 and the IR detector 52 does not send a signal to the microprocessor 34 to activate the light source. However, if the IR detector 52 receives radiation at a power level differing by more than a predetermined threshold from the predetermined power level emitted by the IR emitter 50 for a predetermined time period, then a film 40 has been interposed between the IR emitter 50 and the IR detector 52 and the IR detector 52 then sends a signal to the microprocessor 34 to activate the light source.

In one embodiment, IR detector 52 sends a logical "1" signal to microprocessor 34 when there is no or reduced infrared radiation detected and the light source has to be activated, and a logical "0" signal, when there is no film 40 between emitter 50 and IR detector 52 and the light source does not have to be activated. In another embodiment of the present invention, the IR detector 52 can provide a signal to the microprocessor 34 indicative or representative of the power level of the radiation received by the IR detector 52. Microprocessor 34 can then determine when to activate the light source based on the signal received from the IR detector 52. Preferably, this determination is based upon a comparison of the power detected by IR detector 52 at different intervals. In another embodiment, microprocessor 34 is configured to activate the light source when the change in voltage detected by IR detector 52 exceeds a preselected value in a predetermined amount of time.

In another embodiment of the present invention, where the microprocessor 34 receives a signal from IR detector 52 indicative of the voltage received by the IR detector 52, the microprocessor 34 can determine whether film 40 is transparent, optically clear, translucent or opaque. As will be appreciated by those of ordinary skill in the art, optically clear films are a subset of transparent films that have a higher level of transparency and thus can be viewed through with even greater clarity. In each case, the microprocessor 34 and switching arrangement 36 can determine when a film 40 is inserted into viewer 10 and what type of film has been inserted. As an example, if the IR emitter 50 is emitting signals at a power level of 4.0 volts, the IR detector 52 sending a signal of about 3.7 to 3.8 volts can indicate that a transparent film is positioned between IR emitter 50 and IR detector 52, and the IR detector 52 sending a signal of about 0.89 to 1.3 volts can indicate that an opaque film is placed between IR emitter 50 and IR detector 52. Once the type of film is detected, the light source can be controlled to obtain improved viewing conditions for the film.

In another embodiment, multiple switch mechanisms 36 can be employed to illuminate viewer 10. As is known in the art, a single viewer may be used to illuminate and interpret multiple films 40 in a single viewing. The advantage to a medical professional is not only that multiple films can be viewed, but also that similar films can be compared adjacent one another. To ensure activation of the light source when a film 40 is placed on the viewer 10 off-center, multiple switch mechanisms 36 can be located along the length of holder 16 to provide for multiple detection locations. In this embodiment, microprocessor 34 would be configured to illuminate the light source when one switch mechanism 36 detects a film 40. In an alternate embodiment, multiple switch mechanisms 36 can be employed to illuminate preselected regions of viewer 10. In this embodiment, the light source would be comprised of distinct light sources that are illuminated by light control system 24 as adjacent switch mechanisms 36 detect the presence of a film 40.

Upon activation of the light source to illuminate viewer 10, the technician can manually alter the intensity of the light source with dimmer buttons 26, 28. In one embodiment, dimmer button 26 can provide a signal to the light source for incrementally increasing the output of the light source. Similarly, dimmer button 28 can provide a signal to the light source for incrementally decreasing the output intensity of the light source. The light control system 24 can provide the light source with the dimming commands directly for dimming buttons 26, 28 or the light control system 24 can provide the dimming commands from the dimmer buttons 26, 28 through the microprocessor 34 to control the functions of viewer 10. In the embodiment shown, the dimming function is controlled by a second microprocessor which can provide dimming commands to the light source.

Light control system 24 further operates to deactivate the power supply to the light source after film 40 is removed from viewer 10. In one embodiment, microprocessor 34 detects when IR detector 52 receives substantially the predetermined power level emitted by IR emitter 50, indicating that there is no film 40 interposed between IR emitter 50 and IR detector 52. When light control system 24 detects that there is no film 40 interposed between IR emitter 50 and IR detector 52, then microprocessor 34 can send a signal to deactivate the light source. Microprocessor 34 is also preferably configured to wait a predetermined amount of time after light control system 24 detects that there is no film 40 interposed between IR emitter 50 and IR detector 52 before deactivating the light source. In this manner, the light source is not constantly activated and deactivated as a film 40 is removed and another film 40 is positioned on screen 14. As will be appreciated, some light sources, such as a cold cathode tube, require some time to acquire full illumination after startup. In addition, viewer 10 may be provided with a user interface for allowing a technician to adjust the predetermined amount of time that microprocessor 34 delays between detecting that there is no film 40 interposed between IR emitter 50 and IR detector 52, and deactivating the light source.

Figure 4:
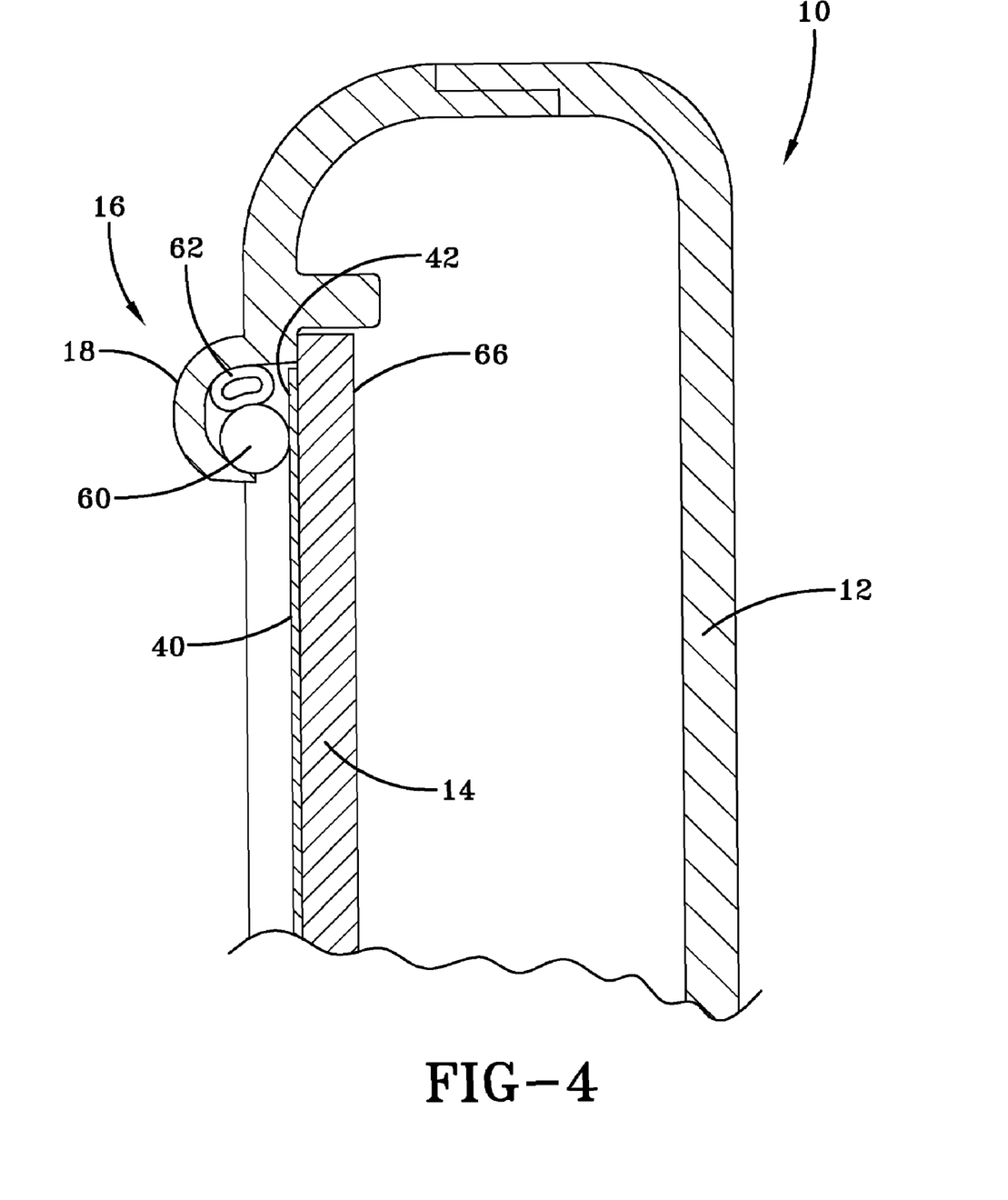
FIG. 4 is a sectional view taken along the line 4-4 of FIG. 2, with the light source removed for clarity.

FIG. 4 illustrates one embodiment of the holder 16 used with the present invention. Holder 16 preferably extends across substantially the entire width of the viewing area of the viewer 10. Holder 16 includes a contoured portion 18, an upper portion 66 of screen 14 spaced a distance from the contoured portion 18, and a plurality of rollers 60. Housing portion 18 is contoured to form a channel such that rollers 60 are directed toward screen 14 as the force of gravity pulls the rollers 60 downward in the direction of arrow D when the viewer is mounted in a non-horizontal position. As shown in FIG. 2, a series of rollers 60 are used within film holder 16 to provide multiple independent areas of contact between film 40 and rollers 60. In operation, a technician inserts a film 40 into holder 16 in a direction that is substantially opposite to arrow D. As the upper portion 42 of film 40 is inserted into holder 16, the upper portion 42 of film 40 displaces rollers 60 upwardly and away from screen 14. As the technician continues to insert film 40, rollers 60 are further displaced within holder 16 such that the upper portion 42 is interposed between the rollers 60 and the screen 14. Once the film 40 is in position, the acceleration of gravity acting on rollers 60 to attempt to return rollers 60 to their original position provides resultant vectored forces with a horizontal component acting on both film 40 and contoured housing portion 18. The mass of rollers 60 is selected to provide an appropriate force on film 40 that engagingly holds film 40 in position. In other embodiments of the present invention other suitable techniques and systems can be used for holder 16 to secure film(s) in position.

One such example is also shown in FIG. 2, in which a length of tubing 62 made from a resilient, flexible material, such as latex, is placed within the channel created by contoured portion 18 to provide a spring force against rollers 60. As shown in FIG. 4, tubing 62 is deformed from its tube shape by rollers 60 positioned in the contoured portion 18. The tubing 62 attempts to return to its natural, cylindrical shape, thus exerting a force against rollers 60 to secure film 40 against screen 14 so that the film 40 is held in place unless and until it is intentionally removed, for example, by a technician.

When film removal is desired, the technician pulls the film 40 in a direction that is substantially in the direction of arrow D, causing rollers 60 to engagingly roll or slide along the upper portion 42. Thus, holder 16 bindingly engages a film 40 when inserted therein, and allows the film 40 to be removed by a technician. Holder 16 can secure more than one film 40 at one time, regardless of the relative thickness of each film, due to the plurality of rollers 60 which can operate substantially independently of one another. The contoured portion 18, while described herein as a portion of housing 12, may be any structural portion adapted to direct rollers 60 toward another structure in order to bindingly engage a film.

Figure 5A:
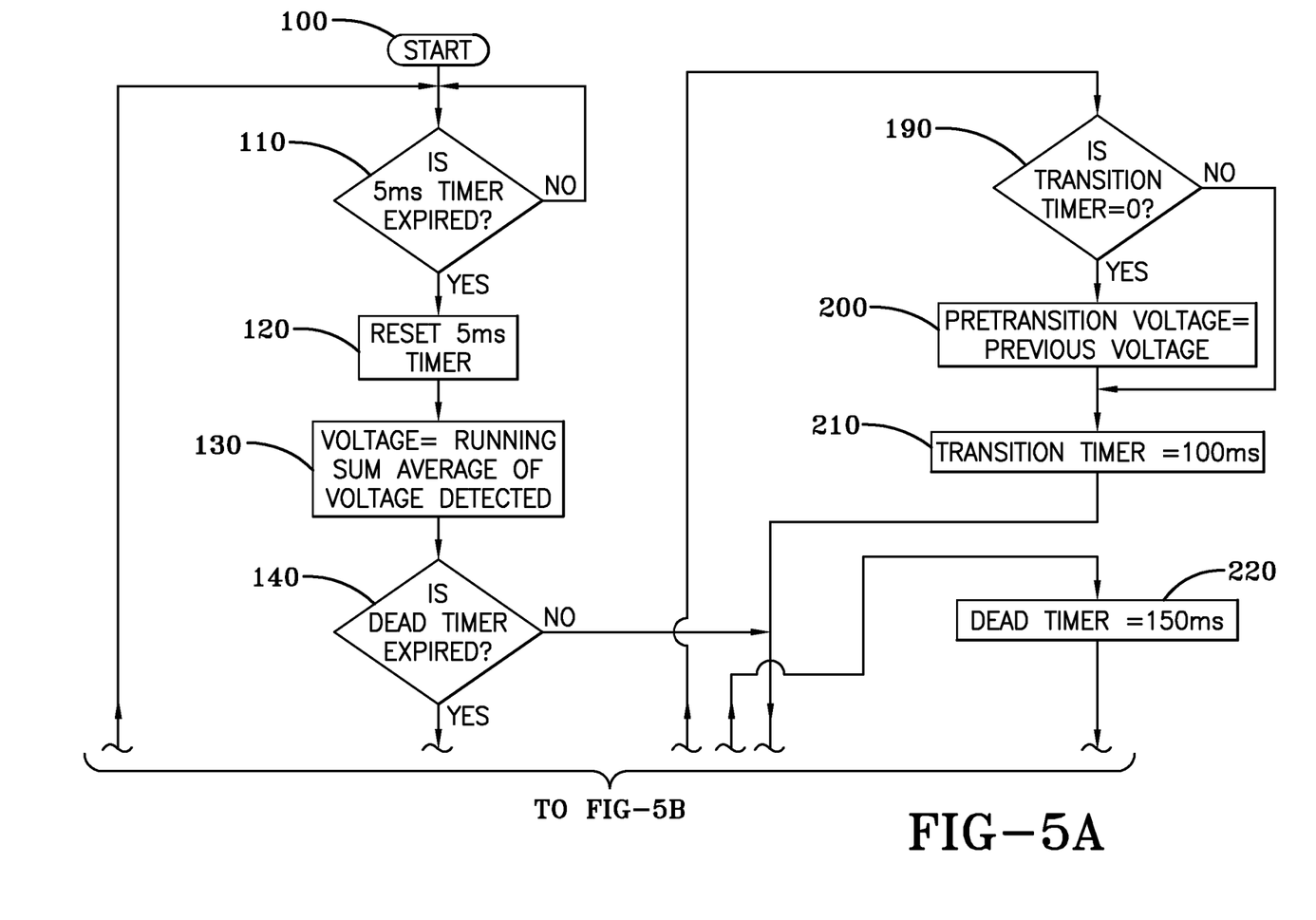
FIG. 5 is a flowchart illustrating an illumination control process of the present invention.
Figure 5B:
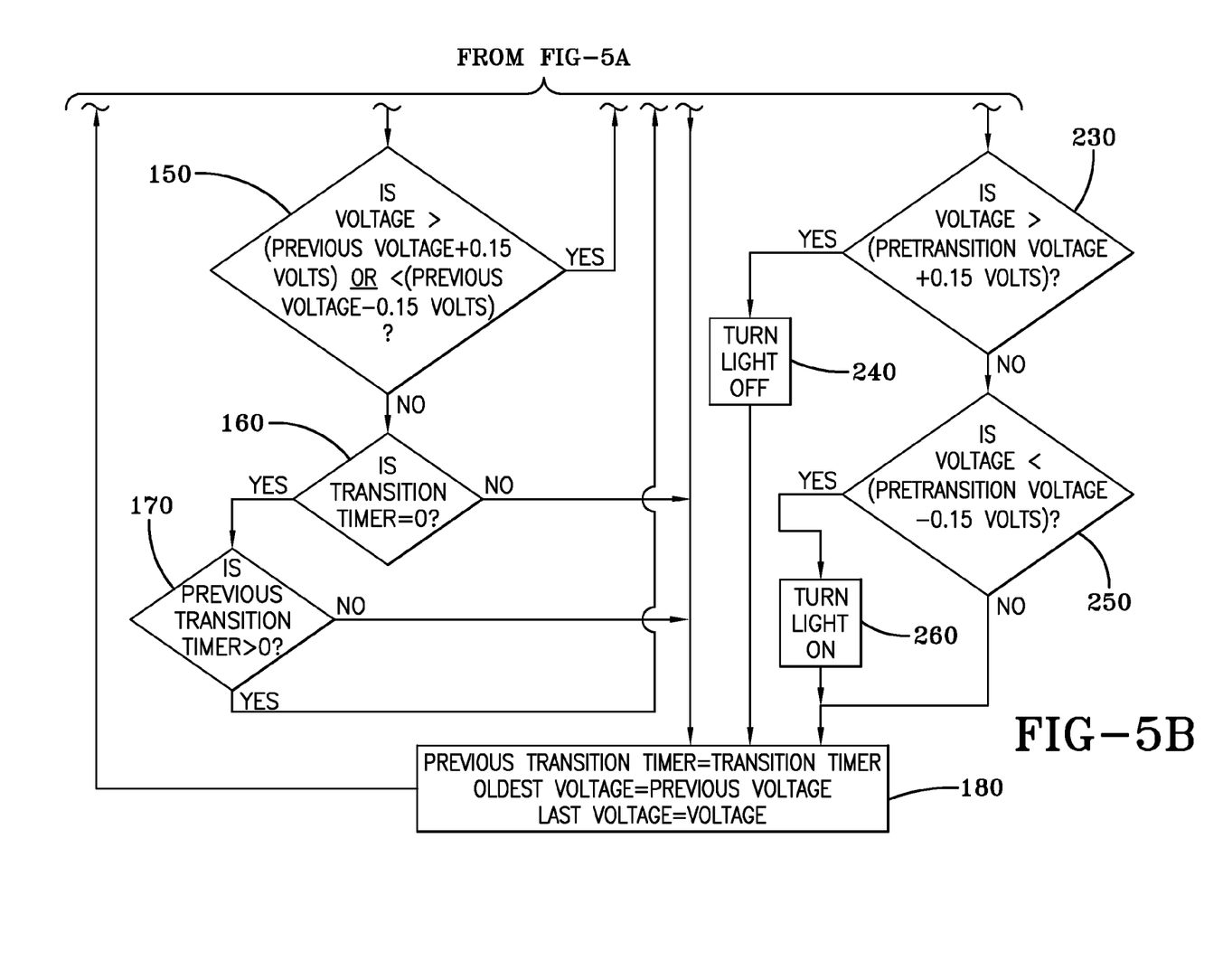

FIG. 5 illustrates an exemplary control process executed by microprocessor 34 to control the light source. When power is supplied to power connection 30, IR emitter 50 begins to emit IR radiation toward IR detector 52, IR detector 52 sends a signal to microprocessor 34 indicative of the voltage output detected, and microprocessor 34 begins the illustrated process at block 100. Block 110 determines whether a 5 ms timer has expired for sampling the voltage output detected by the IR detector 52. If the 5 ms timer has not expired, the process returns to block 110. If the 5 ms timer has expired, the process proceeds to block 120. Block 120 resets the 5 ms timer and block 130 samples the voltage output detected by the IR detector 52. It should be appreciated that the 5 ms timer has been so designated for purposes of illustration. However, for the 5 ms timer and all other timers discussed herein, any period of time may be selected and the periods of time recited in this discussion are only exemplary.

After sampling the voltage in block 130, block 130 calculates and stores in memory a Voltage value. The value Voltage is equal to the running sum average of a predetermined number of stored samples, including the sample taken in block 130, of the voltages detected by IR detector 52. Block 140 determines whether a "dead" timer has expired. If the dead timer has not expired, the process proceeds to block 180. If the dead timer has expired, the process proceeds to block 150. The dead timer is used to ensure that a sufficient amount of time has elapsed since the last light switching event has occurred, either on or off.

Block 150 determines whether the Voltage value calculated in block 130 has changed by more than a preselected voltage, e.g. ±0.15 volts, from a Previous Voltage value that had been calculated. If the determination made in block 150 is positive, a transition is occurring, i.e., a film has either been inserted or removed and the light source has to be correspondingly turned on or off, and the process proceeds to block 190. If the determination made in block 150 is negative, the process proceeds to block 160.

Block 160 determines whether a Transition Timer value is zero indicating that a transition has not occurred for a predetermined time period. In one embodiment, the Transition Timer is a countdown timer in a timer interrupt. If the determination made in block 160 is positive, the process proceeds to block 170. If the determination made in block 160 is negative, the process proceeds to block 180. Block 170 determines whether a Previous Transition Timer value is greater than zero indicating that the Transition Timer has just expired. If the determination made in block 170 is positive, the process proceeds to block 220. If the determination made in block 170 is negative, the process proceeds to block 180.

Block 180 sets the Previous Transition Timer value equal to the Transition Timer, the Oldest Voltage value equal to the Previous Voltage value calculated by microprocessor 34, and the Previous Voltage value equal to the Voltage value calculated by microprocessor 34. After these values are established in block 180, the process returns to block 110.

Block 190 determines whether the Transition Timer is zero indicating the start of a transition. If the determination made in block 190 is positive, a transition is starting and the process proceeds to block 200. If the determination made in block 190 is negative, the process proceeds to block 210. Block 200 sets the Pre-Transition Voltage value equal to the Previous Voltage value, and the process proceeds to block 210. Block 210 resets the transition timer to 100 ms, and the process proceeds to block 180.

Block 220 resets the dead timer to 150 ms, and the process proceeds to block 230. Block 230 determines whether the Voltage value is greater than the sum of the Pre-Transition Voltage plus the preselected voltage, e.g., 0.15 volts, indicating that the Voltage value is being maintained above the Pre-Transition Voltage value. If the determination made in block 230 is positive, the process proceeds to block 240. If the determination made in block 230 is negative, the process proceeds to block 250. Block 240 sends a signal to de-activate the power supply to the light source, and the process proceeds to block 180.

Block 250 determines whether the most recent voltage value is less than the difference of the Pre-Transition Voltage and the preselected voltage, e.g., 0.15 volts, indicating that the Voltage value is being maintained below the Pre-Transition Voltage value. If the determination made in block 250 is positive, the process proceeds to block 260. If the determination made in block 250 is negative, the process proceeds to block 180. Block 260 sends a signal to illuminate the light source, and the process proceeds to block 180.

Microprocessor 34 executes instructions to perform the operations and calculations illustrated in FIG. 5. Microprocessor 34 monitors the output of IR detector 52. The output of IR detector 52 can change when a film is inserted between IR emitter 50 and IR detector 52. A positive determination in block 150 indicates that a transition, such as a film insertion or removal, has occurred. As best illustrated in blocks 250 and 260, microprocessor 34 can send a signal to illuminate the light source when the periodically detected voltage falls 0.15 volts. Blocks 230 and 240 illustrate that microprocessor 34 can send a signal to deactivate the power source to the light source when the periodically detected voltage rises 0.15 volts.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A light control system for a film viewer comprising:
   an infrared emitter configured to emit a predetermined amount of infrared radiation;
   an infrared detector disposed adjacent to the infrared emitter and configured to detect infrared emissions from the infrared emitter; and
   a microprocessor configured to control a light in response to a change in the detected infrared emissions resulting from one of an insertion of a film between the infrared emitter and the infrared detector and a removal of a film from between the emitter and the detector, wherein the microprocessor is further configured to determine a type of film, selected from the group consisting of opaque, transparent and optically clear, interposed between the infrared emitter and infrared detector in response to the change in the detected infrared emissions.

2. The light control system of claim 1 wherein the microprocessor is configured to energize the light in response to a decrease in the detected infrared emissions resulting from the insertion of a film between the infrared emitter and the infrared detector.

3. The light control system of claim 1 wherein the microprocessor is configured to deenergize the light in response to an increase in the detected infrared emissions resulting from the removal of a film between the infrared emitter and the infrared detector.

4. The light control system of claim 1 further comprising a manual dimming control.

5. The light control system of claim 1 wherein the infrared emitter is an infrared LED.

6. The film viewer of claim 1, wherein the predetermined amount of infrared radiation is emitted at a predetermined frequency.

7. A film viewer comprising:
   a housing;
   a light;
   an infrared emitter configured to emit a predetermined amount of infrared radiation;
   an infrared detector adjacent the infrared emitter and configured to detect infrared emissions from the infrared emitter; and
   a microprocessor configured to detect a change in infrared emissions detected by the infrared detector when a film is interposed between the infrared emitter and the infrared detector, and further configured to energize the light in response to the detected change in emissions in response to an optically clear film being interposed between the infrared emitter and infrared detector.

8. The film viewer of claim 7 further comprising a manual dimming control.

9. The film viewer of claim 7 wherein the infrared detector is in optical communication with the infrared emitter.

10. The film viewer of claim 7 further comprising a film holding mechanism including a series of rollers interposed between a housing portion and a viewing screen, wherein the housing portion is contoured to direct the rollers toward the screen as the rollers move in response to gravity within the mechanism.

11. The film viewer of claim 10 further comprising a length of resilient tubing within the contoured housing portion, wherein the tubing directs the rollers toward the screen.

12. A method of controlling illumination in a film viewer, the method comprising:
   emitting a detectable infrared emission with an infrared emitter configured to emit a predetermined amount of infrared radiation;
   detecting a level of infrared emissions received by an infrared detector;
   determining a change in the detected level of infrared emissions; and
   automatically controlling a light source in the film viewer in response to the determined change in the detected level of infrared emissions exceeding a preselected value, the preselected value corresponding to a change in the detected level of infrared emissions smaller than a change in the detected level of infrared emissions corresponding to infrared emissions passing through an optically clear film.

13. The method of claim 12 wherein the step of determining a change in the detected level of emissions includes:
   determining a running sum average of a predetermined number of detected levels of infrared emissions; and
   determining a difference between the determined running sum average and a previously determined running sum average.

14. The method of claim 13 further comprising storing the previously determined running sum average in response to the determined difference between the determined running sum average and a previously determined running sum average exceeding the preselected value.

15. The method of claim 14 wherein the step of automatically controlling a light source includes energizing a light source in response to a subsequently determined running sum average being less than the stored running sum average minus the preselected value.

16. The method of claim 14 wherein the step of automatically controlling a light source includes deenergizing a light source in response to a subsequently determined running sum average being greater than the stored running sum average plus the preselected value.

17. The method of claim 12 wherein the step of detecting a level of infrared emissions received by a detector occurs every 5 milliseconds.

* * * * *